(12) United States Patent
Ndzebet

(10) Patent No.: US 6,919,142 B2
(45) Date of Patent: Jul. 19, 2005

(54) CONDUCTING POLYMER ADDITIVES FOR ALKALINE ELECTROCHEMICAL CELL HAVING ZINC ANODE

(75) Inventor: Ernest Ndzebet, Middleton, WI (US)

(73) Assignee: Rovcal, Inc., Fresno, CA (US)

(*) Notice: Subject to any disclaimer, the term of this patent is extended or adjusted under 35 U.S.C. 154(b) by 202 days.

(21) Appl. No.: 10/318,683

(22) Filed: Dec. 13, 2002

(65) Prior Publication Data

US 2003/0138694 A1 Jul. 24, 2003

Related U.S. Application Data

(60) Provisional application No. 60/341,207, filed on Dec. 13, 2001.

(51) Int. Cl.$^7$ ................................................. H01M 4/42
(52) U.S. Cl. ..................... 429/229; 429/217; 429/232; 429/206; 429/212; 252/182.1
(58) Field of Search ................................ 429/229, 217, 429/232, 206, 212; 252/182.1

(56) References Cited

U.S. PATENT DOCUMENTS

| | | | |
|---|---|---|---|
| 4,687,598 A | * | 8/1987 | Varma .......................... 429/212 |
| 4,820,595 A | | 4/1989 | MacDiarmid et al. |
| 5,541,020 A | | 7/1996 | Golovin et al. |
| 5,645,890 A | | 7/1997 | MacDiarmid et al. |
| 5,686,204 A | | 11/1997 | Bennett et al. |
| 5,824,434 A | | 10/1998 | Kawakami et al. |
| 6,060,116 A | | 5/2000 | Kulkarni et al. |
| 6,072,026 A | | 6/2000 | Kawase et al. |
| 6,174,623 B1 | | 1/2001 | Shackle |
| 6,207,326 B1 | | 3/2001 | Kawakami et al. |
| 6,284,410 B1 | * | 9/2001 | Durkot et al. .............. 429/229 |

FOREIGN PATENT DOCUMENTS

| | | |
|---|---|---|
| CA | 2112384 | 1/1993 |
| JP | 61068864 | 4/1986 |
| JP | 61260546 | 11/1986 |
| JP | 62097261 | 5/1987 |
| JP | 62184779 | 8/1987 |
| JP | 63026955 | 2/1988 |
| JP | 63152867 | 6/1988 |
| JP | 63231873 | 9/1988 |
| JP | 2002151064 A2 | 5/2002 |
| WO | WO 89/02155 | 3/1989 |
| WO | WO 93/00716 | 1/1993 |
| WO | WO 94/27297 | 11/1994 |
| WO | WO 95/24741 | 9/1995 |

OTHER PUBLICATIONS

Cao et al., "Counter–ion induced processibility of conducting polyaniline and of conducting polyblends of polyaniline in bulk polymers," Synthetic Metals 48:91–97 (1992).

Cao et al., "Effect of Solvents and Co–solvents on the Processibility of Polyaniline: I. Solubility and Conductivity studies," Synthetic Metals 69:187–190 (1995).

Wessling, B., "Passivation of Metals by Coating with Polyaniline: Corrosion Potential Shift and Morphological Changes," Adv. Mater. 6:226–228(1994).

* cited by examiner

Primary Examiner—Laura Weiner
(74) Attorney, Agent, or Firm—Quarles & Brady LLP

(57) ABSTRACT

Inclusion of an electronic conducting polymer additive powder in a gelled anode of an alkaline electrochemical cell having an anode active metal material can improve discharge performance of the cell. A preferred conducting polymer powder is polyaniline powder.

13 Claims, 2 Drawing Sheets

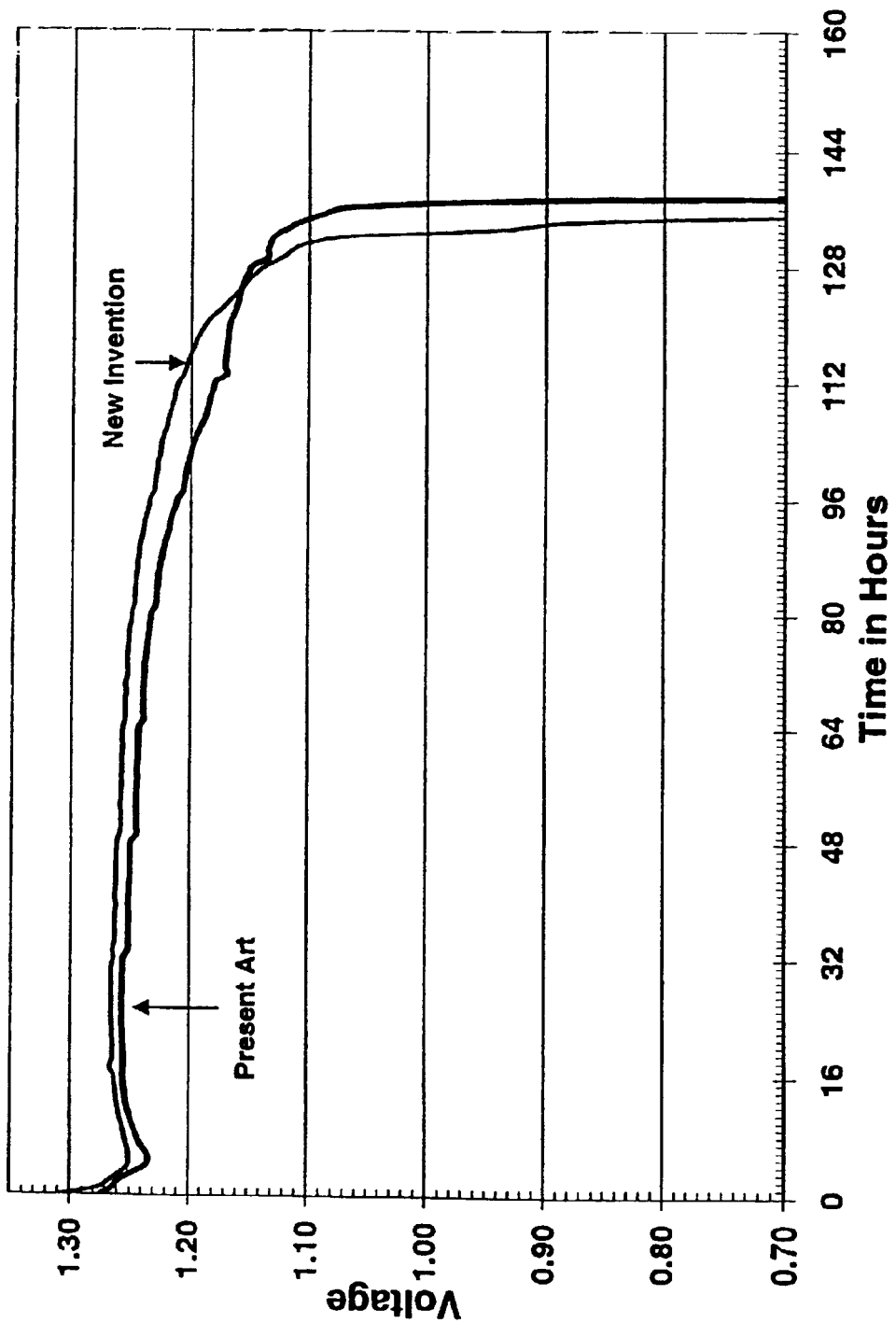

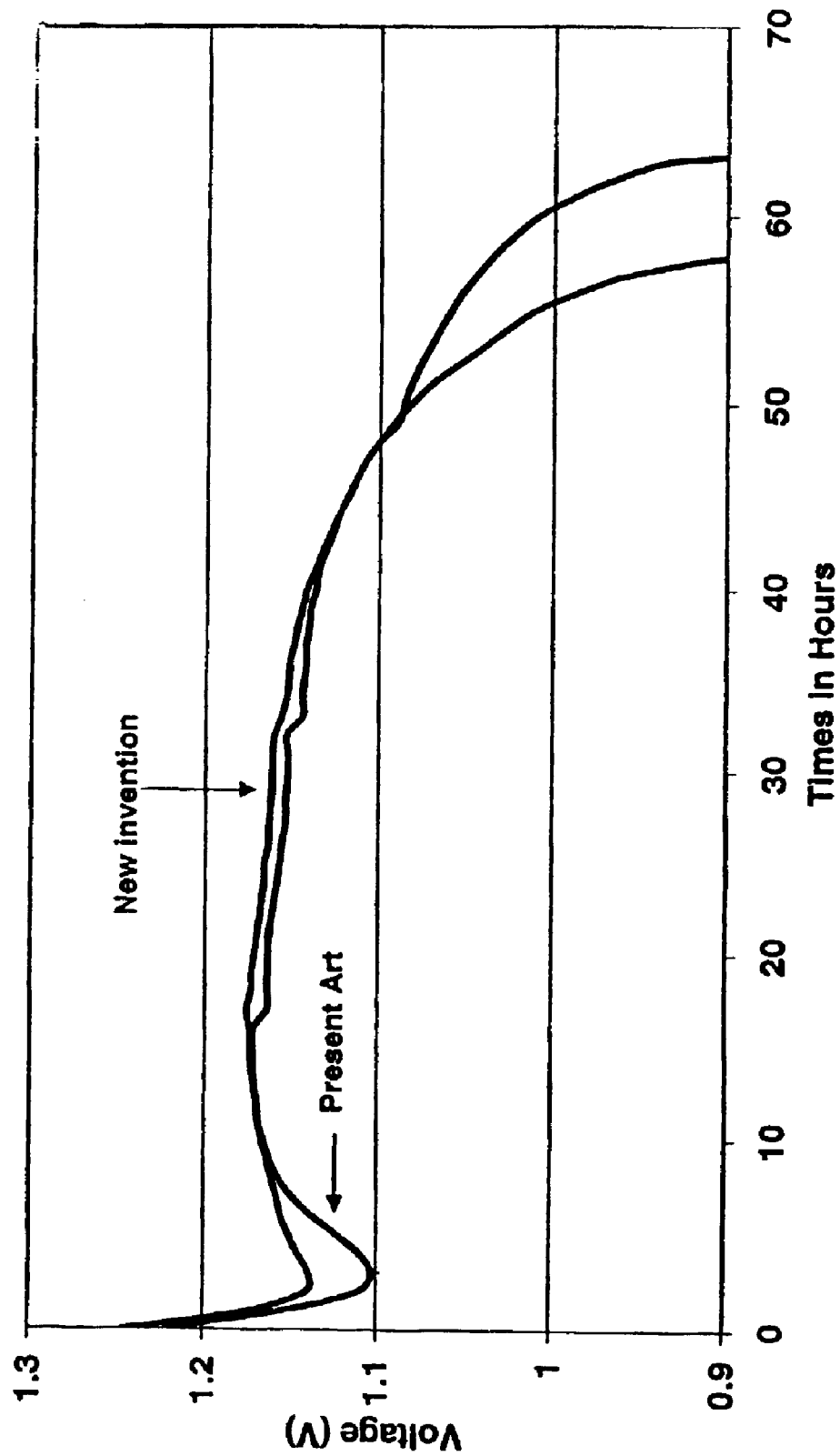

CONDUCTING POLYMER ADDITIVES FOR ALKALINE ELECTROCHEMICAL CELL HAVING ZINC ANODE

CROSS-REFERENCE TO RELATED APPLICATIONS

This application claims the benefit of U.S. Provisional Application No. 60/341,207 filed Dec. 13, 2001.

STATEMENT REGARDING FEDERALLY SPONSORED RESEARCH OR DEVELOPMENT

Not applicable.

BACKGROUND OF THE INVENTION

The present invention relates to alkaline electrochemical cells that contain a conductive polymer additive for improving discharge performance. The invention is applicable to both primary and secondary cells.

The structures of alkaline electrochemical cells are well known. Typically, a cell includes an anode, a cathode, a separator between the anode and the cathode, and an electrolyte in contact with both the anode and cathode. The anode typically includes metal (often zinc) particles, and where the anode is a gelled anode, a gelling agent in the electrolyte. In the normal operation of an alkaline electrochemical cell, the metal particles must remain in electrical contact with adjacent particles and with a current collector. When particles become isolated from one another, the particles cannot participate in the electrochemical process and the discharge capacity is reduced. To maintain electrical contact between zinc particles and the current collector, a intercalating conductive carrier is typically added to the anode. In the past, mercury was employed, in the form of amalgamated zinc particles. However, as a result of environmental concerns, mercury is now substantially absent from the anodes. In its place, various conducting agents have been employed. Conducting agents are also employed in cathodes. Suitable conducting agents include polymers coated with conductive materials, and a number of such polymers have been employed.

International publication number WO 93/00716 (International Application No. PCT/CA92/00270) discloses alkaline zinc anodes for rechargeable cells in which the anode comprises zinc particles, zinc oxide, alkaline electrolyte, gelling agent and a conductive fiber structure admixed with the anode mass. The fibers themselves are described as being preferably of a non-conductive material such as polyimide having a conductive coating of copper, silver, gold or nickel. Such conductive metalized polymer fibers brought about an improvement of up to twenty percent in accumulated cycle capacity for a rechargeable C-size alkaline battery. No polymer is identified as suitable for use apart from non-conductive polymers coated with a conductive material. There is no indication of the suitability of, e.g., polyaniline, a known anticorrosive bulk electro-active polymer. See also Taucher, W. et al., "Conductive Fillers for Immobilized Alkaline Zinc Anodes," *J. of Appl. Electrochem.*, 22:86–98 (1992).

U.S. Pat. No. 6,174,623 describes improvements to electrodes in solid or liquid electrochemical cells where a conductive polymer such as polyaniline is added to an electrode to improve conductivity. It is also known in the art to provide anode and cathode electrodes made of a major amount of a conducting polymer as the electrode itself. U.S. Pat. No. 6,174,623 notes that many conducting polymers are difficult to work with and some are simply intractable high molecular weight materials, insoluble in ordinary solvents and prone to decomposition below their melting or softening point. To avoid these issues, the patent, which relates primarily to solid rather than liquid electrochemical cells, requires treatment of the conducting polymer to render it suitable for coating the active material. The treatment steps include dissolving the conducting polymer in a solvent and mixing the solubilized conducting polymer with the active particles and then removing substantially all of the solvent from the mixture to form a paste suitable for curing to form a solid electrode. Such processing steps have effects on the electrical conductivity of the polymer. For example, solution casting of film coatings onto substrates can significantly impact the polymer chain conformations as gelation occurs during solvent evaporation. Additionally, the choice of solvent can determine whether the polymer chain exhibits an expanded or compacted structure. Both chain confirmation and morphology can significantly affect the $\pi$-conjugation lengths and electronic levels of electronic conducting polymers such as polyaniline which are composed of conjugated polymer chains with $\pi$ electrons delocalized along the backbone.

U.S. Pat. No. 5,645,890 discloses methods for inhibiting surface corrosion on metal substrates by depositing a polyaniline coating onto an exposed surface. The surface is contacted by a solution that contains the polyaniline dissolved in an organic solvent.

A negative impact on the electronic conductive properties of polyaniline is known, when the polyaniline is dissolved in an organic solvent and used at high pH. For example, Alonso et al., J. Electroanal. Chem., 481:200–207 (2000) studied the catalytic behavior of a molybdenum-doped ruthenium selenide catalyst supported on a polyaniline matrix. In that work, polyaniline was synthesized and converted to emeraldine base before being dispersed in an organic solvent with the catalyst. The solvent was evaporated from the resulting dispersion to prepare the catalyst supported on the polyaniline matrix. The catalytic oxygen-reducing activity of these electrodes was higher at a pH of up to 3, where the dispersed catalyst shows good catalytic activity without impact on the conductivity of the polyaniline matrix. At higher pH, however, catalytic activity was lower due to the loss of polyaniline conductivity. Thus, it is unacceptable to include an electronic conducting polymer dissolved in an organic solvent in a process for preparing an electrode for use in an alkaline environment. The use of such dissolved polymers is also unacceptable in a process for manufacturing a battery as it introduces solvent residues and impurities having unknown effects on electrochemical cells.

However, it is an important goal of the battery industry to develop suitable replacements for environmentally unacceptable intercalation compounds where the replacements are compatible with existing manufacturing processes and performance requirements and have no detrimental effect upon discharge performance. There is therefore a need to develop an effective process for employing a conductive polymer additive in an alkaline electrochemical system, where the process is free of organic solvent steps and requires no curing step.

BRIEF SUMMARY OF THE INVENTION

The present invention is summarized in that an electronic conducting polymer powder is a suitable replacement for an intercalation compound that maintains electric conductivity between an anode active material and a current collector in an alkaline electrochemical cell.

It is an object of the present invention to enhance the anode conductivity and discharge performance in alkaline electrochemical cells having anodes containing low mercury or no mercury.

It is a feature of the present invention that the gelled anode of an electrochemical cell comprises low mercury or mercury free metal powder, a conducting polymer powder, a gelling agent, and alkaline electrolyte containing a metal oxide.

It is an advantage of the present invention that the discharge performance of an alkaline electrochemical cell is improved without resort to environmentally disfavored intercalation compounds. In particular, cells of the invention exhibit high operating voltage, reduced second potential dip, reduced sensitivity to open circuit rest and good high rate pulse capability.

It is also an advantage that the conductive polymer powder need not be prepared by applying a conductive surface coating to a non-conductive substrate such as a fiber.

It is a further advantage that the conductive polymer powder need not be dissolved in an organic solvent prior to use. Rather the conductive powder can be dry mixed with other dry ingredients and used directly as a powder, thereby avoiding the known detrimental effects on electronic conductivity that are associated with organic-solvent-dissolved polyaniline under alkaline conditions.

Other objects, features and advantages will become apparent upon consideration of the following detailed description taken in conjunction with the accompanying drawings.

BRIEF DESCRIPTION OF THE SEVERAL VIEWS OF THE DRAWINGS

FIG. 1 illustrates the discharge curve at 620 Ohm of load, 16 hours per day, 70° F., 50% relative humidity of cells built with an anode containing an electronic conductive polymer.

FIG. 2 depicts the discharge profile on the Danish Pulse Test (12 mA/4 mA for 1 hour, 16 hours per day), of cells built with an anode containing an electronic conductive polymer.

DETAILED DESCRIPTION OF THE INVENTION

Electrochemical cells of the invention can be otherwise conventional alkaline electrochemical cells having an anode, a cathode, an ionically permeable separator therebetween and an electrolyte in contact with the anode and the cathode. The anode of the invention comprises an anode active material, preferably comprises a zinc powder which can be a zinc alloy, an alkaline electrolyte, a gelling agent and an electroconducting polymer powder in electrical contact with the anode active material, where the powder is substantially free of an organic solvent residue. The remaining aspects of an electrochemical cell according to the invention are conventional. For alkaline zinc manganese dioxide cells, a typical construction is shown in U.S. Pat. No. 5,789,102, incorporated by reference herein as if set forth in its entirety. For zinc air cells, a typical construction is shown in U.S. Pat. No. 5,721,065, incorporated by reference herein as if set forth in its entirety. Other alternatives include zinc silver oxide cells such as that described in U.S. Pat. No. 6,001,508, incorporated by reference herein as if set forth in its entirety.

All of the aforementioned can include a gelled zinc anode as described herein. The anode can be prepared in an otherwise conventional manner, as is described in the incorporated patents, except insofar as the dry components of the anode, namely the zinc alloy powder, the conducting polymer powder and the gelling agent are dry mixed to form a dry mixture. The dry mixture is then mixed with an alkaline electrolyte to form a gelled zinc anode for incorporation into an electrochemical cell. No chemical or thermal treatment is applied during the mixing process and the conducting polymer powder is substantially free of an organic solvent residue. A powder is considered "substantially free" of the organic solvent residue if it is employed without dispersion in an organic solvent. The powder preferably retains, at an alkaline pH, at least 80%, preferably 90%, of the conductivity observed at a pH of up to 3.

A preferred electroconducting polymer powder is polyaniline powder which is commercially available from Alfa Aesar. The structure of polyaniline is described in U.S. Pat. No. 5,645,890, incorporated herein by reference as if set forth in its entirety. This incorporated patent also discloses suitable methods for making polyaniline.

In anodes of the present invention, polyaniline powder is incorporated into the anode at a concentration of between about 0.0001% and about 5% by weight relative to the weight of the anode active material.

Zinc air cells comprising a gelled zinc anode of the invention were prepared according to incorporated U.S. Pat. No. 5,721,065. FIG. 1 illustrates the discharge curve at 620 Ohm of load, 16 hours per day, 70° F., 50% relative humidity, and FIG. 2 depicts the discharge profile on the Danish Pulse Test (12 mA/4 mA for 1 hour, 16 hours per day), of cells built with an anode containing an electronic conductive polymer, namely polyaniline, according to the invention. Taken together, these results demonstrate the higher operating voltage, reduced second potential dip, reduced sensitivity to open circuit rest, and good high rate pulse capability of alkaline cells comprising a zinc anode that contains an electroconductive polymer additive in addition to the anode active material.

The present invention is not intended to be limited to the preceding example, but rather to encompass all such modifications and variations as come within the scope of the appended claims.

I claim:

1. A gelled anode mixture comprising:
   an anode active material;
   an alkaline electrolyte;
   a gelling agent; and
   an electronic conducting polymer powder in electrical contact with the anode active material, the conducting polymer powder being substantially free of organic solvent residue.

2. A gelled anode mixture as claimed in claim 1 wherein the anode active material comprises zinc.

3. A gelled anode mixture as claimed in claim 1 wherein the anode active material is a zinc alloy powder.

4. A gelled anode mixture as claimed in claim 1 wherein the alkaline electrolyte is potassium hydroxide.

5. A gelled anode mixture comprising:
   an anode active material;
   an alkaline electrolyte;
   a gelling agent;
   an electronic conducting polymer powder in electrical contact with the anode active material; the conducting polymer powder being substantially free of organic solvent residue; and
   wherein the electronic conducting polymer powder is polyaniline.

6. A gelled anode mixture as claimed in claim 5 wherein the electronic conducting polymer powder is polyaniline provided in the anode at between about 0.0001% and about 5% by weight relative to the anode active material.

7. An alkaline electrochemical cell comprising:
   an gelled anode mixture comprising an anode active material; an alkaline electrolyte; a gelling agent; and an electronic conducting polymer powder in electrical contact with the anode active material; the conducting polymer powder being substantially free of organic solvent residue;
   a cathode; and
   a separator therebetween.

8. An alkaline electrochemical cell as claimed in claim 7 wherein the anode active material comprises zinc.

9. An electrochemical cell as claimed in claim 7 wherein the anode active material is a zinc alloy powder.

10. An electrochemical cell as claimed in claim 7 wherein the alkaline electrolyte is potassium hydroxide.

11. An alkaline electrochemical cell comprising:
    an gelled anode mixture comprising an anode active material; an alkaline electrolyte; a gelling agent; and an electronic conducting polymer powder in electrical contact with the anode active material; the conducting polymer powder being substantially free of organic solvent residue;
    a cathode; and
    a separator therebetween; and
    wherein the electronic conducting polymer powder is polyaniline.

12. An alkaline electrochemical cell as claimed in claim 11 wherein the electronic conducting polymer powder is polyaniline provided in the anode at between about 0.0001% and about 5% by weight relative to the anode active material.

13. A method for making a gelled anode, the method comprising the steps of:
    dry mixing an anode active material, an electronic conducting polymer powder substantially free of organic solvent residue, and a gelling agent to form a dry mixture;
    combining the dry mixture with an alkaline electrolyte to form a gelled anode.

* * * * *